(12) United States Patent
Miura et al.

(10) Patent No.: US 12,457,310 B2
(45) Date of Patent: Oct. 28, 2025

(54) PROJECTOR

(71) Applicant: CASIO COMPUTER CO., LTD., Tokyo (JP)

(72) Inventors: Kohei Miura, Tokyo (JP); Tomoyuki Ueda, Tokyo (JP); Hirofumi Fujikura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 412 days.

(21) Appl. No.: 18/125,040

(22) Filed: Mar. 22, 2023

(65) Prior Publication Data
US 2023/0254460 A1    Aug. 10, 2023

Related U.S. Application Data

(63) Continuation of application No. PCT/JP2021/032631, filed on Sep. 6, 2021.

(30) Foreign Application Priority Data

Sep. 24, 2020  (JP) ................................ 2020-159224
Feb. 5, 2021   (JP) ................................ 2021-017720

(51) Int. Cl.
*H04N 9/31*     (2006.01)
*G09G 3/00*     (2006.01)

(52) U.S. Cl.
CPC .......... *H04N 9/3164* (2013.01); *G09G 3/001* (2013.01); *H04N 9/3144* (2013.01)

(58) Field of Classification Search
CPC ..... H04N 9/3164; H04N 9/3144; G09G 3/001

USPC .......................................................... 353/52
See application file for complete search history.

(56) References Cited

U.S. PATENT DOCUMENTS

| 6,280,038 | B1 | 8/2001 | Fuse et al. |
| 7,384,151 | B2 | 6/2008 | Seki |
| 9,122,139 | B2 | 9/2015 | Hirata et al. |
| 9,612,510 | B2 | 4/2017 | Yanagihara |

(Continued)

FOREIGN PATENT DOCUMENTS

| CN | 208984936 U | * | 6/2019 |
| JP | 2000019496 A |   | 1/2000 |

(Continued)

OTHER PUBLICATIONS

Translation of CN_208984936_U (Year: 2025).*

(Continued)

*Primary Examiner* — Jerry L Brooks
(74) *Attorney, Agent, or Firm* — Holtz, Holtz & Volek PC

(57) ABSTRACT

A projector includes an optical apparatus, a control circuit board disposed above an upper side of the optical apparatus, a cooling fan disposed near a rear surface outside air inlet port in a case which lies opposite to a projection direction and having an upper surface outside air inlet port configured to let in outside air from an upper surface and a lower surface outside air inlet port configured to let in outside air from a lower surface of the case, and a heat sink provided corresponding to a discharge port of the cooling fan and connected with the optical apparatus, and a flow path resistance on a side facing the lower surface outside air inlet port is smaller than a flow path resistance on a side facing the upper surface outside air inlet port.

12 Claims, 15 Drawing Sheets

(56) References Cited

U.S. PATENT DOCUMENTS

| | | | |
|---|---|---|---|
| 10,303,046 B2 | 5/2019 | Nakajima et al. | |
| 10,656,509 B2 | 5/2020 | Okude et al. | |
| 10,884,328 B2 | 1/2021 | Meguro et al. | |
| 2001/0043312 A1 | 11/2001 | Fuse et al. | |
| 2004/0116065 A1 | 6/2004 | Oh | |
| 2007/0195280 A1 | 8/2007 | Chen et al. | |
| 2008/0019827 A1* | 1/2008 | Hirata | F04D 29/582 415/206 |
| 2010/0033690 A1* | 2/2010 | Chen | G03B 21/16 353/61 |
| 2017/0010523 A1 | 1/2017 | Egawa | |
| 2018/0270456 A1 | 9/2018 | Ueda | |
| 2019/0079375 A1 | 3/2019 | Nagatani et al. | |

FOREIGN PATENT DOCUMENTS

| | | |
|---|---|---|
| JP | 4096896 B2 | 3/2008 |
| JP | 2010186148 A | 8/2010 |
| JP | 5535329 B2 | 5/2014 |
| JP | 2016080957 A | 5/2016 |
| JP | 2017021207 A | 1/2017 |
| JP | 2018155860 A | 10/2018 |
| JP | 2018205462 A | 12/2018 |
| JP | 2019052770 A | 4/2019 |
| WO | 2018042816 A1 | 3/2018 |
| WO | 2018042849 A1 | 3/2018 |

OTHER PUBLICATIONS

International Search Report (ISR) (and English language translation thereof) and Written Opinion dated Nov. 16, 2021, issued in International Application No. PCT/JP2021/032631

* cited by examiner

PROJECTOR

CROSS-REFERENCE TO RELATED APPLICATIONS

This patent application is based upon and claims the benefit of priority under 35 USC 119 to Japanese Patent Application No. 2021-017720 filed on Feb. 5, 2021, and Japanese Patent Application No. 2020-159224 filed on Sep. 24, 2020, the entire disclosures of which, including the specifications, claims, drawings, and abstracts, are incorporated herein by reference.

BACKGROUND OF THE INVENTION

Technical Field

The present invention relates to a projector.

Description of the Related Art

There have conventionally been proposed technologies for cooling a light source, a controlling circuit board, and the like of a projector for projecting an image formed by use of a micromirror display device called a digital micromirror device (DMD) or a liquid crystal panel onto a screen. For example, Japanese Unexamined Patent Application Publication No. 2016-80957 discloses a projector in which a partitioning structure is erected to separate a first zone where a light source unit including a light source and a transmitted light type liquid crystal panel is provided from a second zone where a power supply and a control circuit board are disposed, a cooling fan is provided for each of the first and second zones, and outside air is let into the zones through corresponding dust-proof filters. The dust-proofness of the second zone is made less in degree than that of the first zone, so that the cooling efficiency in the second zone is improved.

When attempting to have a projector of a compact shape, plural heat generating members are closely packed together in an interior of a case of the projector. Then, even when attempting to partition the interior of the compact case into two zones such as a first zone and a second zone in a conventional manner by a partitioning structure, there is no available space where to erect the partitioning structure, or the partitioning structure has to be configured into a complex shape, thereby resulting in a case in which partitioning the interior of the compact case into the first and second zones becomes difficult. Then, when attempting to cool the first zone and the second zone with one cooling fan so as to realize such a compact projector, there may be a case in which cooling properly all component parts in the interior of the case of the compact projector becomes difficult.

SUMMARY

According to an aspect of the present invention, there is provided a projector including an optical apparatus, a control circuit board disposed above an upper side of the optical apparatus, a cooling fan disposed near a rear surface outside air inlet portion of a case which lies opposite to a projection direction and having an upper surface outside air inlet port configured to let in outside air from an upper surface and a lower surface outside air inlet port configured to let in outside air from a lower surface of the case, and a heat sink provided corresponding to a discharge port of the cooling fan and connected with the optical apparatus, wherein a flow path resistance on a side facing the lower surface outside air inlet port is smaller than a flow path resistance on a side facing the upper surface outside air inlet port.

DESCRIPTION OF THE EMBODIMENT

Figure 1:
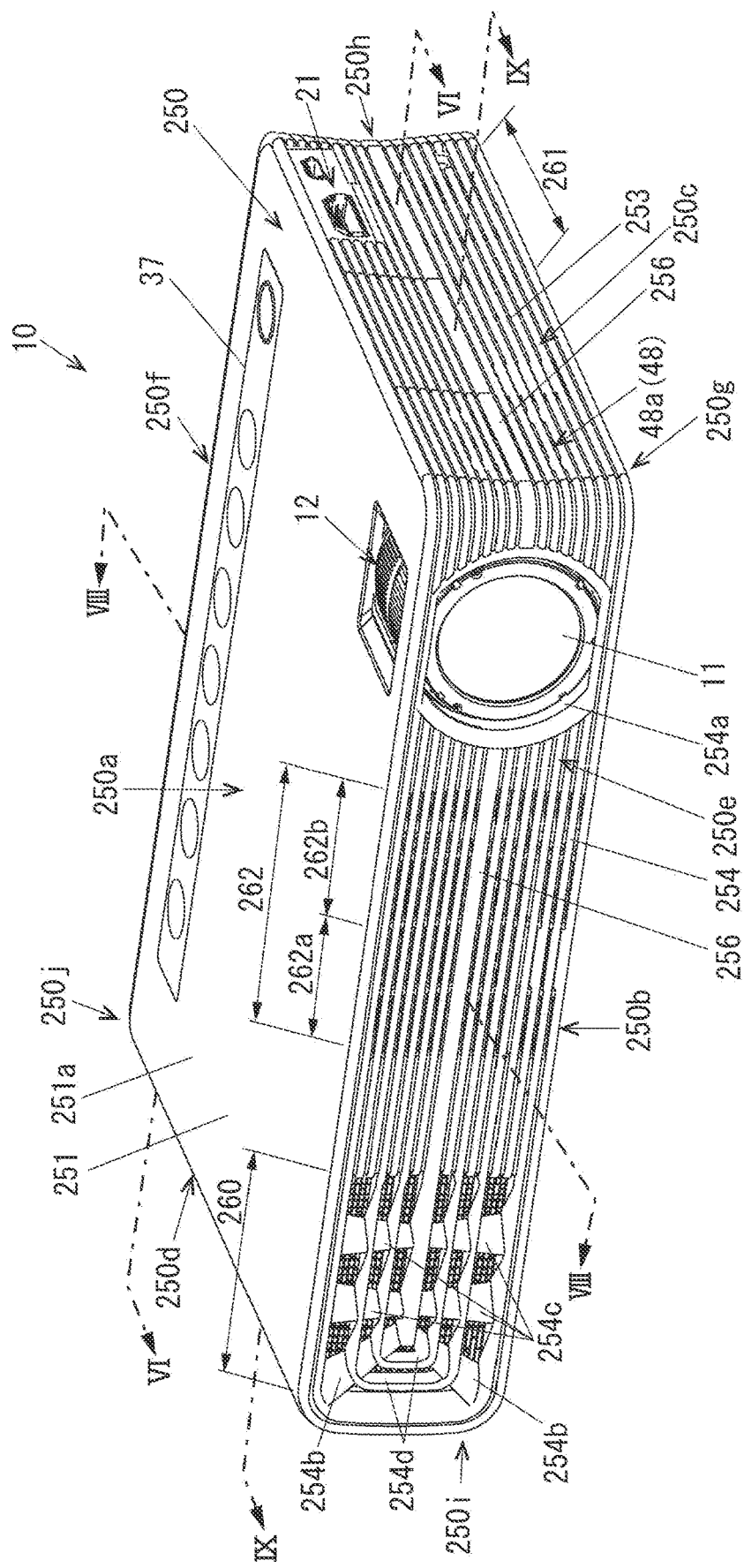
FIG. 1 is a front perspective view showing an external appearance of a projector according to an embodiment of the present invention.
Figure 2:
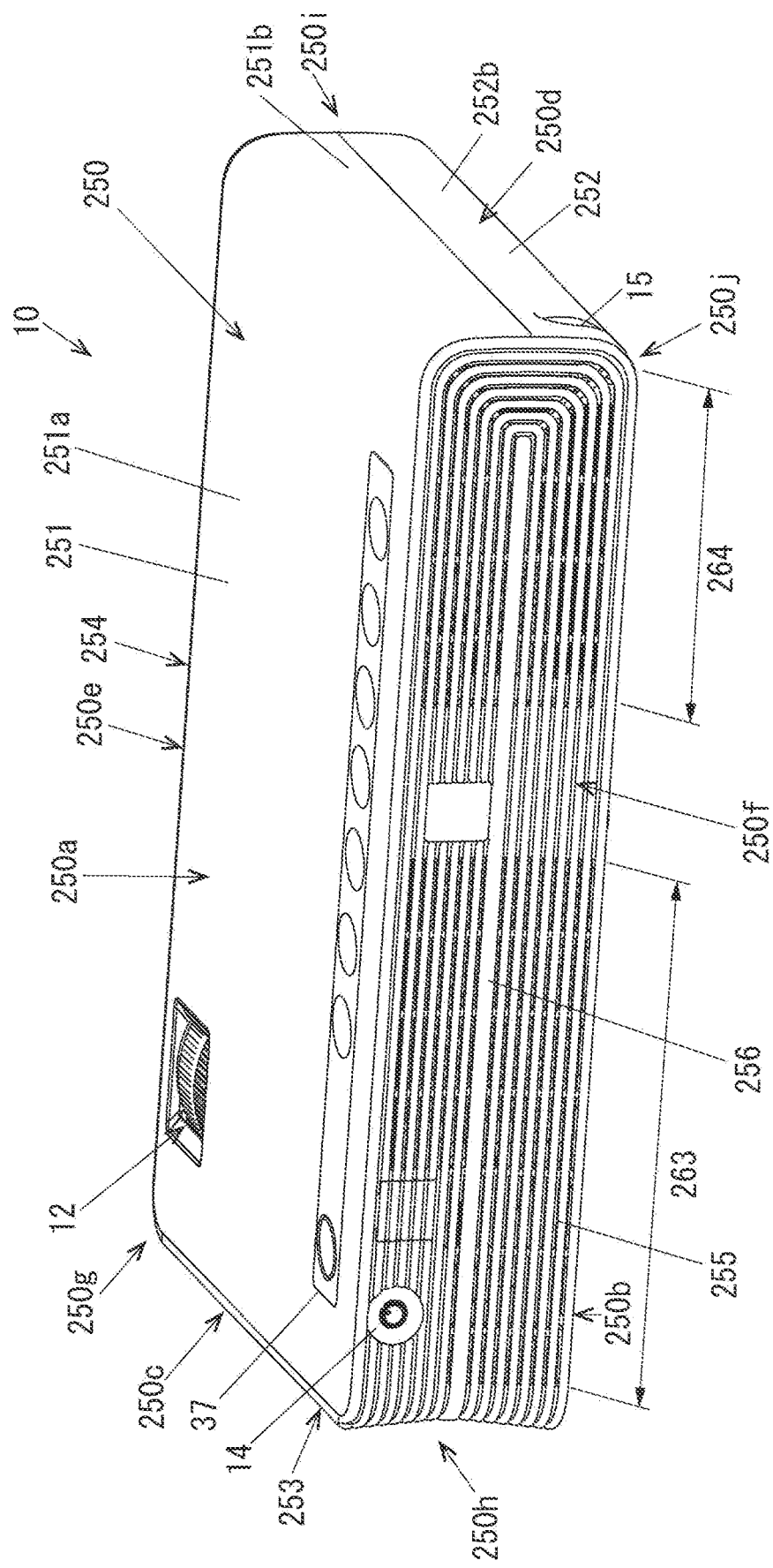
FIG. 2 is a rear perspective view showing the external appearance of the projector according to the embodiment.

Hereinafter, an embodiment of the present invention will be described. As shown in FIGS. 1 and 2, a projector 10 is formed into a compact shape and has a case 250 of a substantially rectangular parallelepiped box shape which is elongated in a left-right direction, which is a longitudinal direction thereof. Thus, the case 250 has six sides or surfaces (an upper surface 250*a*, a lower surface 250*b*, a left surface 250*c* (a second side surface), a right surface 250*d* (a first side surface), a front surface 250*e*, and a rear surface 250*f*) as outer circumferential surfaces thereof. The projector 10 has a projection port 11 in the front surface 250*e* thereof. The projector 10 emits projected light from the projection port 11. In the following description, when directions are described with respect to the projector 10, the left and right of the projector 10 denote respectively a leftward direction and a rightward direction with respect to a projection direction of projected light from the projection port 11, and the front and rear of the projector 10 denote respectively a forward direction and a rearward direction with respect to a traveling direction of projected light of the projector 10.

Figure 3A:
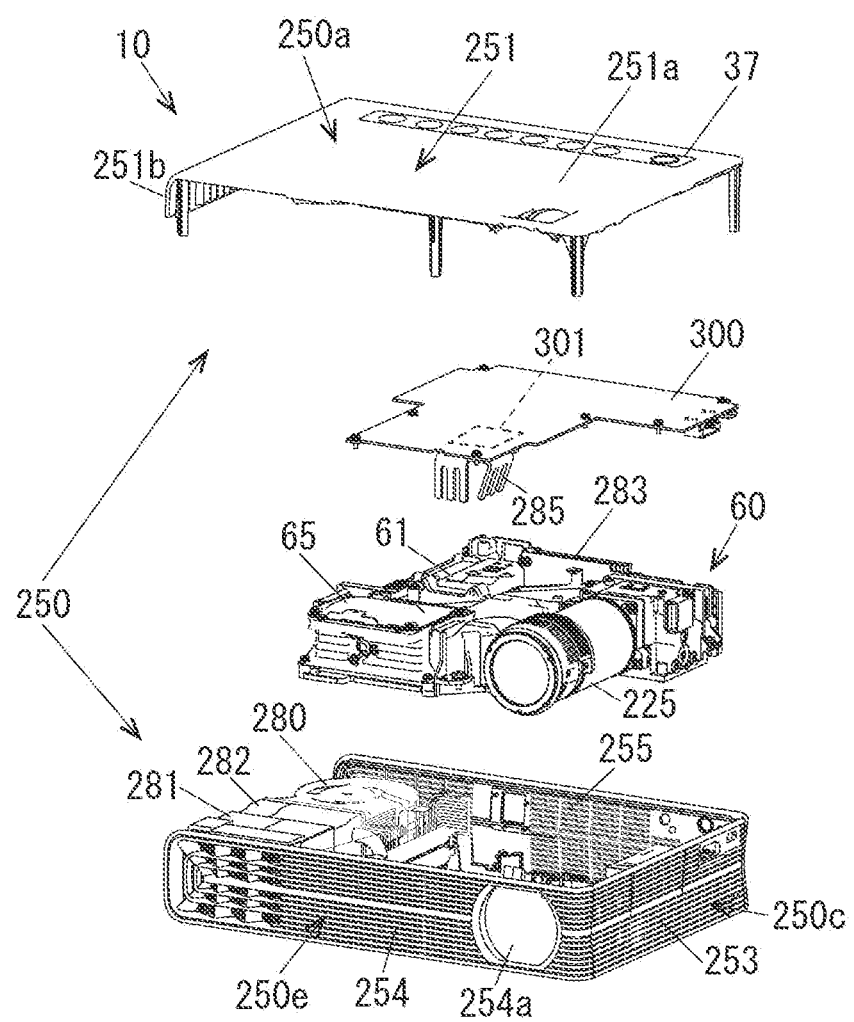
FIG. 3A is an exploded perspective view of the projector according to the embodiment of the present invention, as viewed from above.
Figure 3B:
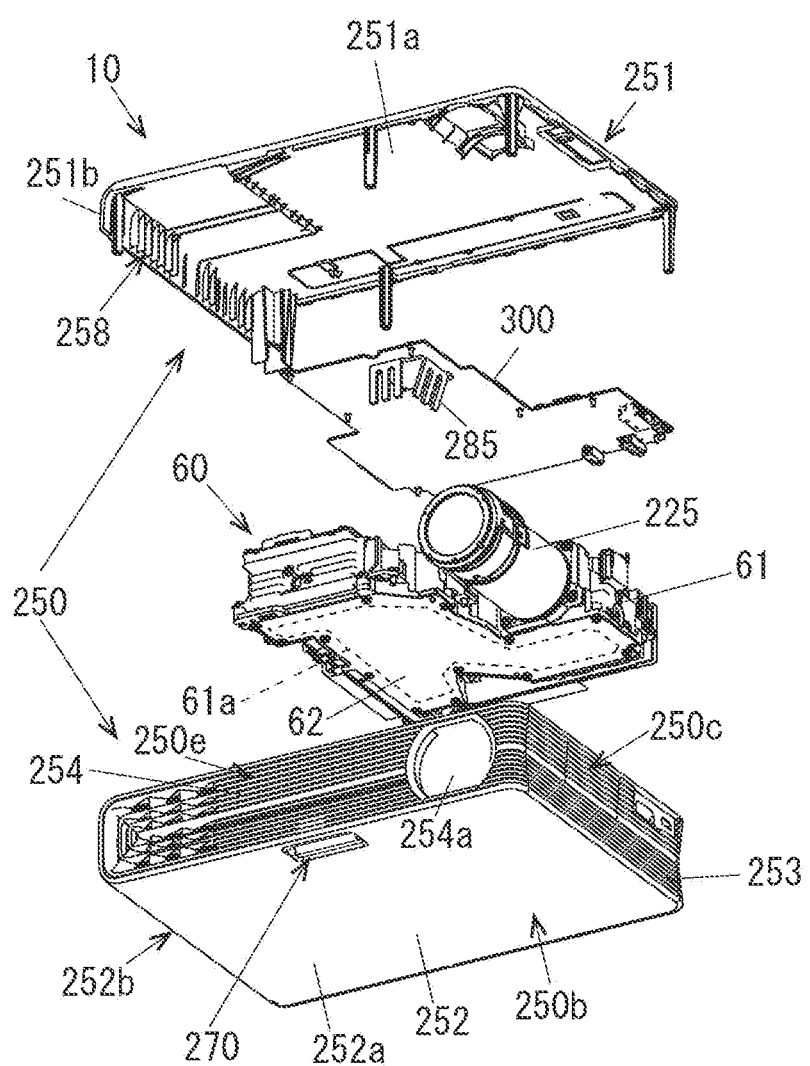
FIG. 3B is an exploded perspective view of the projector according to the embodiment of the present invention, as viewed from below.

The case 250 has an upper case 251, a lower case 252, a left panel 253, a front panel 254, and a rear panel 255. As shown in FIGS. 3A and 3B, too, the upper case 251 has an upper panel portion 251a including the upper surface 250a and a right upper panel portion 251b including a surface which constitutes a part of an upper side of the right surface 250d. The lower case 252 has a lower panel portion 252a including the lower surface 250b and a right lower panel portion 252b including a surface which constitutes a part of a lower side of the right surface 250d. A connecting portion between the upper panel portion 251a and the right upper panel portion 251b and a connecting portion between the lower panel portion 252a and the right lower panel portion 252b are curved into a rounded corner shape. The left panel 253, the front panel 254, and the rear panel 255 constitute outer circumferential panels together with the upper panel portion 251a and the right upper panel portion 251b of the upper case 251 and the lower panel portion 252a and the right lower panel portion 252b of the lower case 252.

A power supply socket 15 is provided in a rear lower side of the right surface 250d (a rear side of the right lower panel portion 252b). Here, the lower case 252 is formed from a metallic material such as magnesium alloy or aluminum alloy through die casting. The upper case 251 and the front, rear, and left panels are formed from a resin material.

A projected image controller 12 including one or plural rotary members is provided at a portion on the upper surface 250a of the upper case 250 which corresponds to the projection port 11. The position of a movable lens of a projection optical system is controlled by operating the rotary member of the projected image controller 12 so as to control the size and focusing of a projected image. Additionally, a keys/indicators section 37 is provided on a rear side of the upper surface 250a of the upper case 251. The keys/indicators section 37 includes keys and indicators which are disposed thereon for setting the projector 10 in various modes. These keys and indicators include a power supply switch key, a power indicator for informing that the power supply to the projector 10 is on or off, a projection switch key for switching on and off the projection by the projector 10, an overheat indicator for informing of an occurrence of overheating in an optical apparatus 60, a display device 51 (which will be described referring to FIG. 11), or a control circuit.

The front panel 254, which is elongated in the left-right direction, extends to a left front corner portion 250g of the case 250, and the left front corner portion 250g is made into a rounded corner. Similarly, the rear panel 255, which is elongated in the left-right direction, extends to a left rear corner portion 250h, and the left rear corner portion 250h is made into a rounded corner. The left panel 253 is provided between the front panel 254 which extends to the left front corner portion 250g and the rear panel 255 which extends to the left rear corner portion 250h.

A horizontal rib 256 is provided substantially at a center in an up-down direction of the left panel 253, the front panel 254, and the rear panel 255 in such a manner as to extend all the way along these panels. A substantially horizontally elongated grid configuration is formed on an upper side and a lower side of the horizontal panel 356 on the left panel 253, the front panel 254, and the rear panel 255. In these left panel 253, the front panel 254, and the rear panel 255, the upper side and the lower side of the horizontal rib 256 incline inwards into the case 250 from the horizontal rib 256 as an apex portion.

An outside air inlet portion 261 is provided over an area on the left panel 253 extending from a substantially central portion to a rear side thereof, and the outside air inlet portion 261 includes plural thin horizontally elongated outside air inlet holes which are formed into a horizontally elongated grid configuration. The plural thin horizontally elongated outside air inlet holes are provided in the outside air inlet portion 261 along a horizontally elongated grid configuration. A speaker portion 48a is provided at a front portion of the left panel portion 253 by opening a part of the horizontally elongated grid configuration thereon. A speaker 48 is provided in an interior of the speaker portion 48a. An image signal input/output connector section 21 is provided at a rear portion of the left panel 253.

In the front panel 254, a predetermined area on a right end side is made into an inside air outlet portion 260, and a predetermined area at a substantially central portion is made into an outside air inlet portion 262. The outside air inlet portion 262 includes a right outside air inlet portion 262a and a left outside air inlet portion 262b. In the front panel 254, a projection port opening portion 254a facing the projection port 11 is provided near the left front corner portion 250g. A right front corner portion 250i where the front panel 254 connects to the right upper panel portion 251b and the right lower panel portion 252b of the right panel 250d is made into a right-angled corner in a plan view.

The inside air outlet portion 260 includes inclined ribs 254b which are provided to extend individually obliquely upwards and downwards in radial directions from a right end of the horizontal rib 256. Additionally, the inside air outlet portion 260 includes two vertical ribs 254c which are provided on each of the upper side and the lower side of the horizontal rib 256 with a predetermined space defined therebetween at portions closer to a center of the front panel 254 than the inclined ribs 254b. The inside air outlet portion 260 includes two horizontally elongated, substantially U-shaped U-shape ribs 254d which are provided one around another in such a manner as to extend over the inclined ribs 254b and the vertical ribs 254c. The inside air outlet portion 260 is such that hole portions thereof are opened larger than those of the outside air inlet portions 261, 262, 263, 264.

Figure 11:
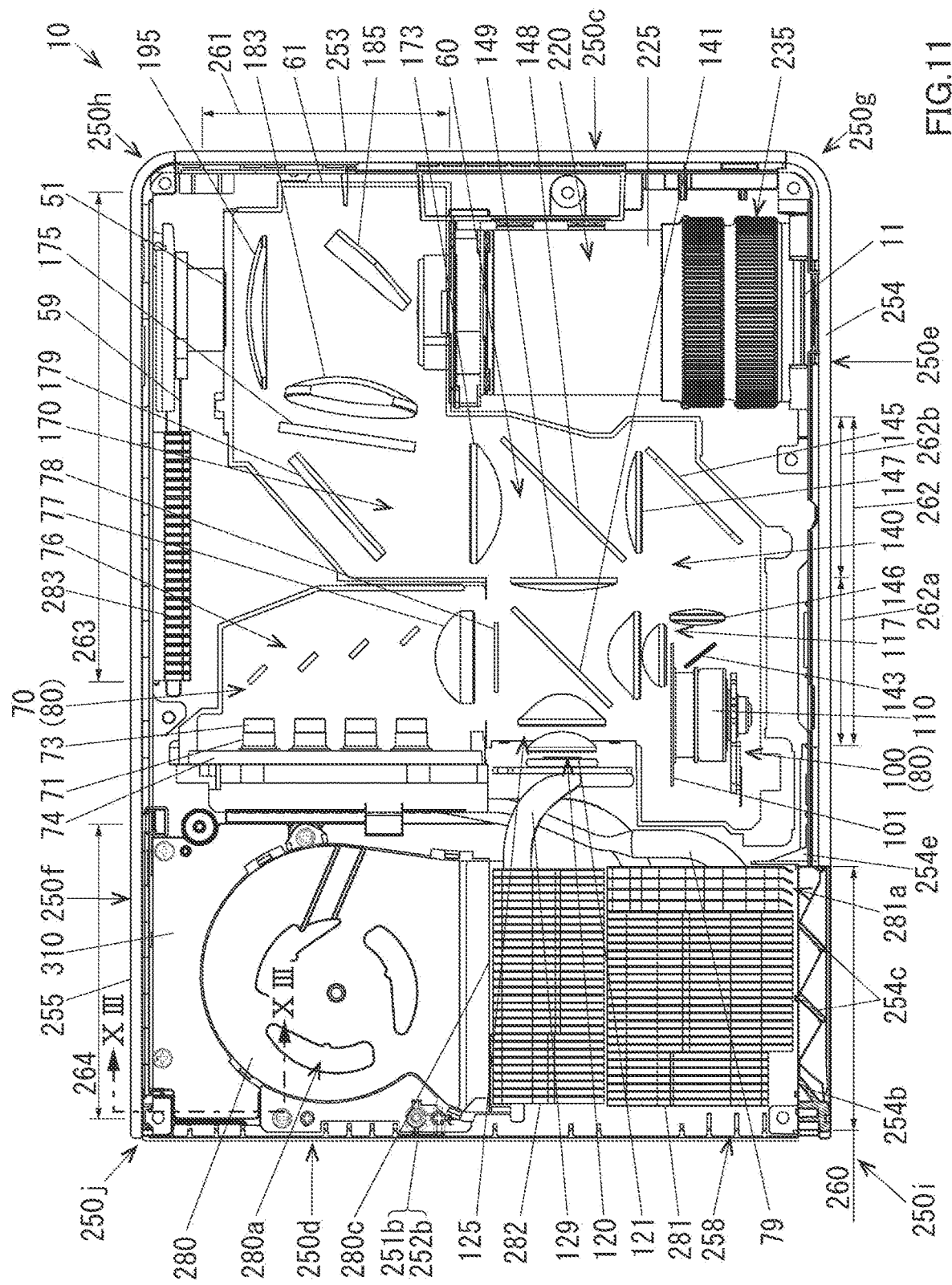
FIG. 11 is a schematic plan view showing an interior structure of the projector according to the embodiment of the present invention.

As shown in FIG. 11, too, the inclined ribs 254b and the vertical ribs 254c are provided inclined so that heated inside air is let out rightwards. Remaining other portions of the front panel 254 than the inside air outlet portion 260 and the projection port opening portion 254a are made into a substantially horizontally elongated grid configuration.

An output socket 14 to sound equipment is provided in a left upper portion of the rear panel 255. A right end side of the rear panel 255 is made into a substantially U-shaped grid configuration which follows horizontally elongated grid configurations of the other portions thereof. The outside air inlet portion 263 is provided over a portion of the rear panel 255 which extends from a left end side to a substantially central portion thereof. The outside air inlet portion 263 includes thin horizontally elongated outside air inlet holes which are formed into a horizontally elongated grid configuration. The outside air inlet portion 264 (a rear surface outside air inlet portion) is provided at a right side portion of the rear panel 255. The outside air inlet portion 264 includes similar outside air inlet holes (thin horizontally elongated outside air inlet holes and thin substantially U-shaped outside air inlet holes). A right rear corner portion 250*j* where the rear panel 255 connects with the right upper panel portion 251*b* and the right lower panel portion 252*b* of the right surface 250*d* is made into a right-angled corner in a plan view.

In this way, the projector 10 includes the outside air inlet and inside air outlet portion including the outside air inlet portions 261 to 264 and the inside air outlet portion 260 which include the plural outside air inlet holes and the plural inside air outlet holes, respectively. In other words, the outside air inlet and inside air outlet portion of the projector 10 has the plural outside air inlet holes and inside air outlet holes.

Next, a mode of accommodation of the case 250 of the projector 10 will be described. As shown in FIGS. 3A and 3B, the case 250 of the projector 10 accommodates therein an optical case 61, a control circuit board 300, a cooling fan 280, a first sink heat 281, and a second heat sink 282. Optical members such as various light sources, lenses, mirrors, and the like of an optical apparatus 60 are disposed in the optical case 61, and a lens barrel 225 is attached to the optical case 61.

Figure 4:
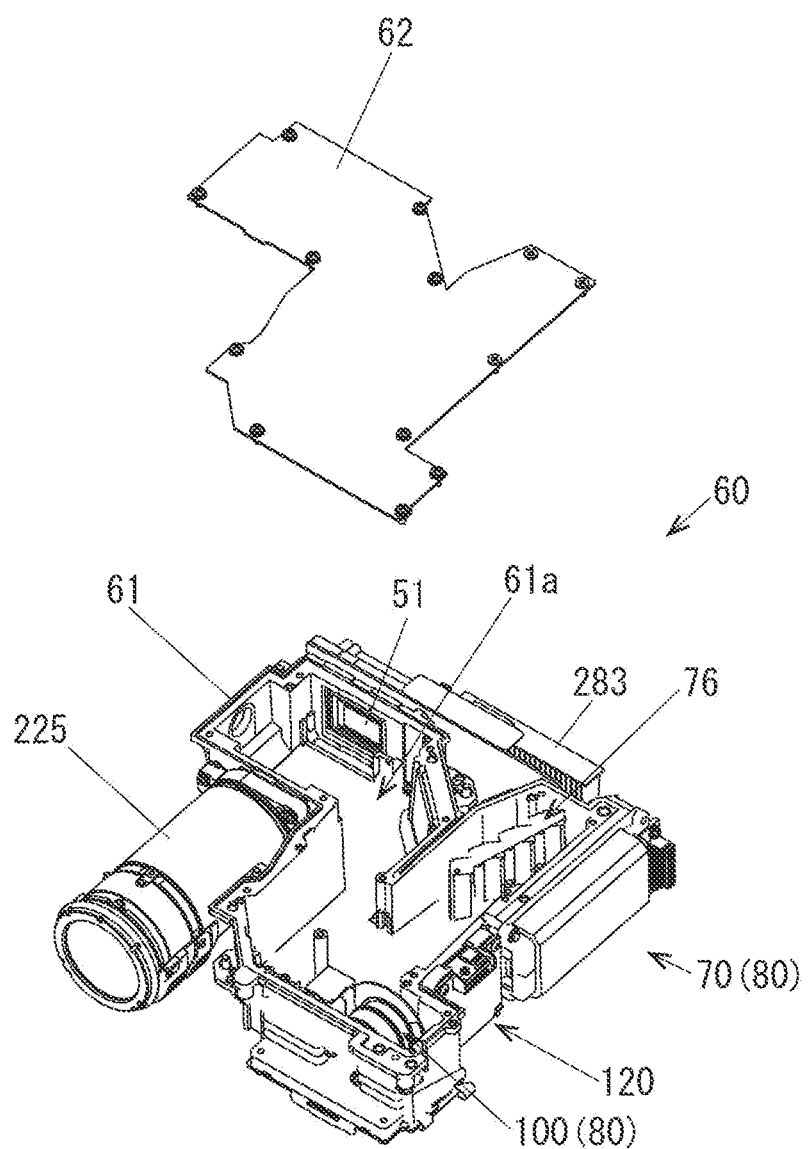
FIG. 4 is an exploded perspective view of an optical apparatus of the projector according to the embodiment of the present invention, as viewed from a lower side.

As shown in FIGS. 3B and 4, in the optical case 61, an opening portion 61*a* is provided in a lower side (a side facing the lower surface 250*b* of the lower case 250, a lower side in a thickness direction of the case 250). A cover member 62 is fixed to the opening portion 61*a* together with a seal member, now shown, with plural bolts for establishing dust proofness. The seal member is disposed along an edge portion of the opening portion 61*a*. The opening portion 61*a* is covered with the cover member 62, whereby an interior of the optical case 61 is made into a closed space. In fabricating the optical apparatus 60, optical members such as lenses and mirrors and light sources are attached through this opening portion 61*a*. Here, FIG. 4 shows an exploded perspective view of the optical apparatus 60 as viewed from a lower side with optical members such as lenses and mirrors which are accommodated in the interior of the optical case 61 omitted from illustration.

A luminescent plate device 100, which will be described later, is covered with the cover 65 with a part thereof projecting via an opening portion in an upper surface of the optical case 61. An attachment range of the cover 65 is limited compared with an attachment range of the cover member 62 and is smaller than the attachment range of the cover member 62. As a result, a dust-proof measure using the seal member or the like is easily applied to the opening which is covered with the cover 65.

As shown in FIG. 3A, the control circuit board 300, which constitutes a main circuit board, is provided on an upper surface side of the optical case 61. The control circuit board 300 is disposed to be fixed to an upper side of the case 250 by being screwed to a boss or a bracket which is erected from the upper surface of the optical case 61 or an inner surface of the lower panel portion 252*a* of the lower case 252. As shown in FIG. 11, too, the cooling fan 280, which is of a blower type using a sirocco fan, is disposed at a right rear portion of the optical case 61 (in other words, near the outside air inlet portion 264 provided on the rear side of the case 250 which is opposite to the projection direction). The cooling fan 280 is provided only one in the projector 10, and hence, no plural cooling fans are provided.

Figure 5A:
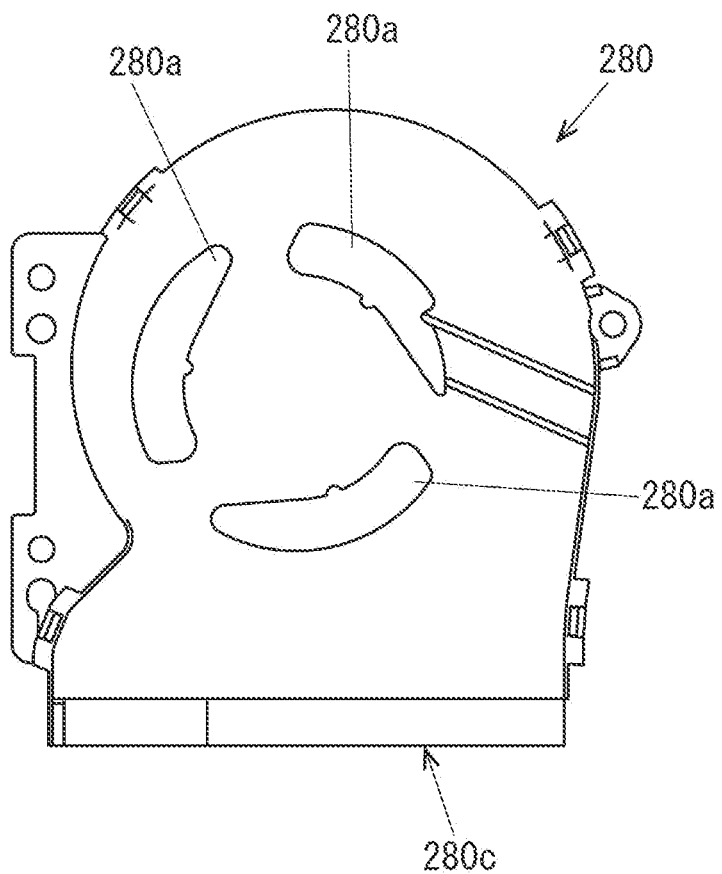
FIG. 5A is a top view of a cooling fan of the projector according to the embodiment of the present invention.
Figure 5B:
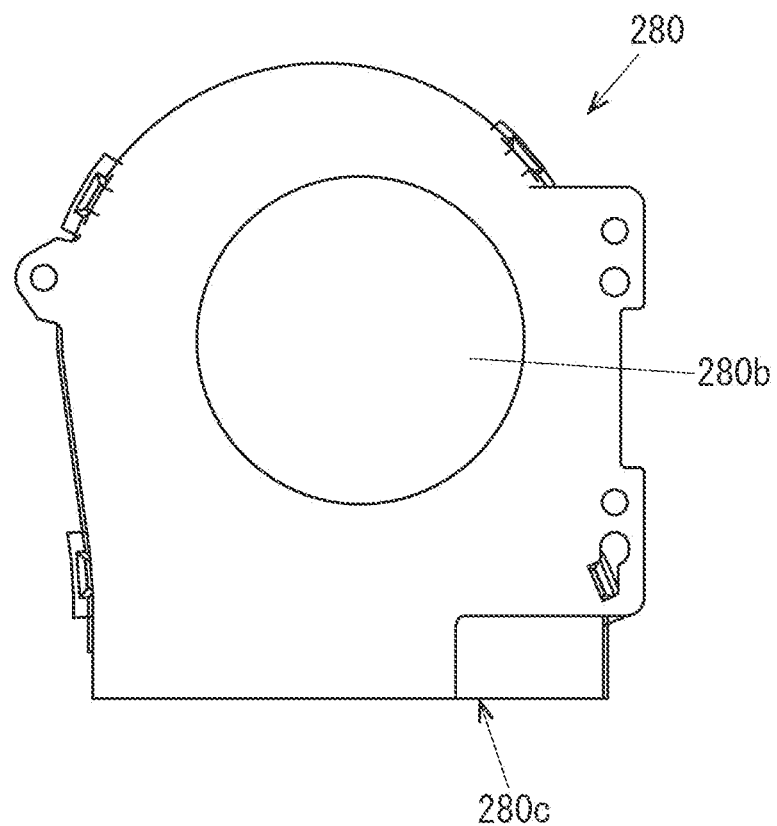
FIG. 5B is a bottom view of the cooling fan of the projector according to the embodiment of the present invention.

As shown in FIG. 5A, upper surface outside air inlet ports 280*a* are provided in an upper surface of the cooling fan 280. These upper surface outside air inlet ports 280*a* are configured to let in outside air from the upper surface of the cooling fan 280. The upper surface outside air inlet ports 280*a* are made up of three substantially arc-shaped openings. On the other hand, a lower surface outside air inlet port 280*b* is provided in a lower surface of the cooling fan 280. The lower surface outside air inlet port 280*b* is made up of one circular opening. A surface area of the lower surface outside air inlet port 280*b* is larger than a surface area of the upper surface outside air inlet ports 280*a* (a total surface area of the three substantially arc-shaped openings). With the cooling fan 280, outside air is let in from the upper surface outside air inlet ports 280*a* and the lower surface outside air inlet port 280*b* and is then let out from a discharge port 280*c* of which an opening direction is at right angles to opening directions of the upper surface outside air inlet ports 280*a* and the lower surface outside air inlet port 280*b*.

Figure 6:
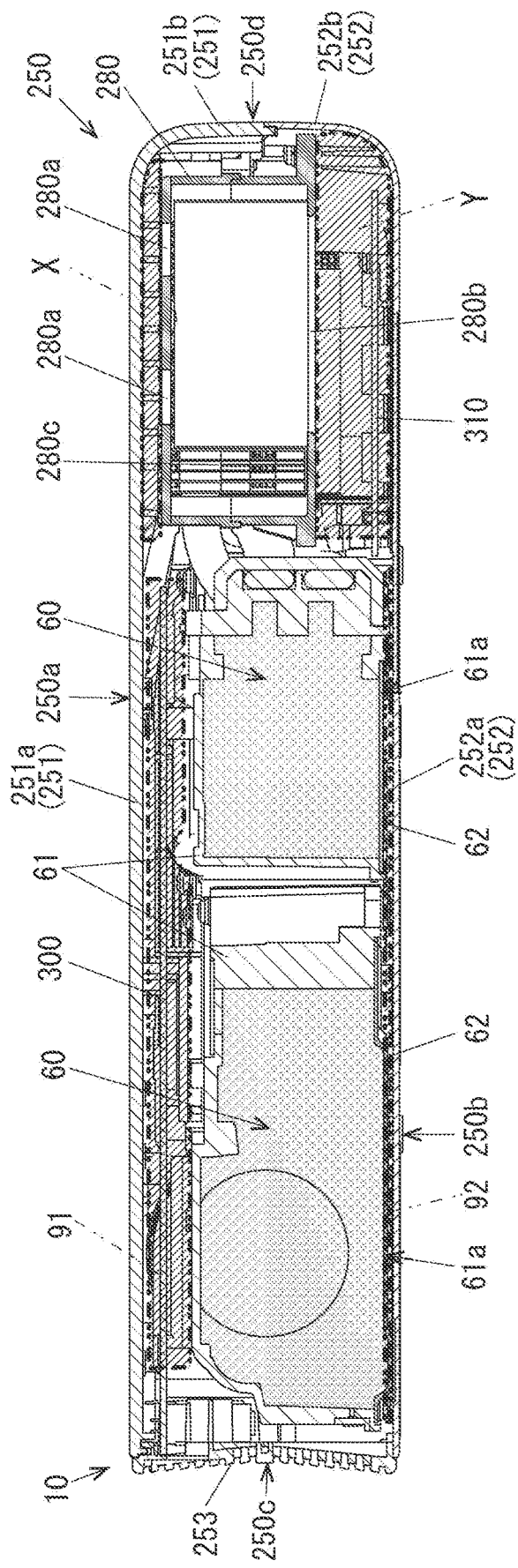
FIG. 6 is a sectional view of the projector according to the embodiment of the present invention taken along a line VI-VI in FIG. 1 with an interior of an optical case of the projector omitted from illustration but shaded.

In addition, as shown in FIG. 6, the cooling fan 280 is provided near the right surface 250*d* (the right upper panel portion 251*b* and the right lower panel portion 252*b*). Here, neither an outside air inlet port nor an inside air outlet port is provided in the right surface 250*d*, and hence, no outside air is let in from the right surface 250*d*. Additionally, the cooling fan 280 is provided at an upper portion in the thickness direction of the case 250. That is, a space defined underneath the cooling fan 280 (a lower space Y surrounded by a chain double-dashed line and shaded inside) inside the cases 250 is wider than a space defined on an upper side of the cooling fan 280 (an upper space X surrounded by a chain double-dashed line and shaded inside) inside the cases 250. Consequently, a flow path resistance in a flow path disposed on a side facing the lower surface outside air inlet port 280*b* is smaller than a flow path resistance in a flow path disposed on a side facing the upper surface outside air inlet ports 280*a*. In FIG. 6, members such as collective lenses and mirrors in the interior of the optical apparatus 60 are omitted from illustration, and the interior of the optical apparatus 60 is instead shown shaded.

Returning to FIG. 3A, the heat sink (the first heat sink 281 and the second heat sink 282), which are connected to the optical apparatus 60, are provided on a front side of the cooling fan 280 In such a manner as to correspond to the discharge port 280*c* of the cooling fan 280. Specifically speaking, the second heat sink 282 is provided at a front side of the discharge port 280*c* of the cooling fan 280, and the first heat sink 281 is provided at a front side of the second heat sink 282. A power supply circuit board 310 (refer to FIG. 6) is disposed directly below a lower side of the cooling fan 280 (between the cooling fan 280 and the lower case 252, that is, the lower space Y). In addition, a third heat sink 283, which is connected to the optical apparatus 60, is provided at a substantially longitudinal central portion on a rear side of the optical case 61. The third heat sink 283 includes plural fins. A recessed gripping portion 270 is provided in a longitudinal central portion on a front side of the lower surface 250*b* of the lower case 252.

Figure 7:
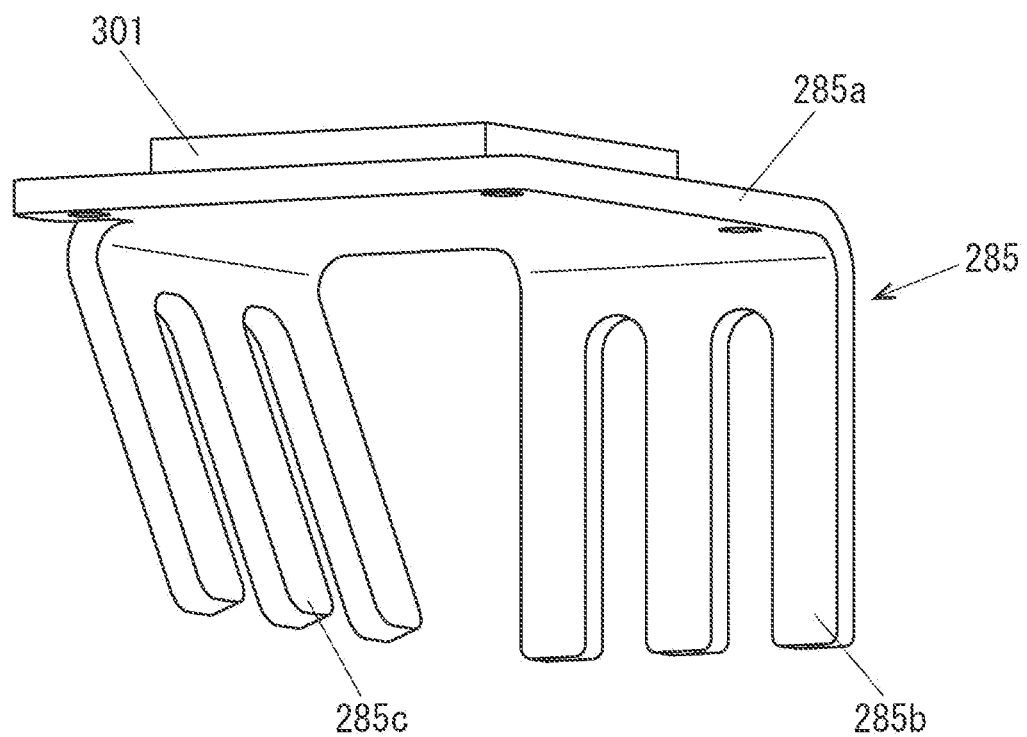
FIG. 7 is a perspective view showing a heat sink for an IC chip of a circuit board of the projector according to the embodiment of the present invention.

An IC heat sink 285 is attached to a front left end of the control circuit board 300 so as to cool an IC chip 301 provided on a lower surface of the control circuit board 300. As shown in FIG. 7, the IC heat sink 285 is made up of a sheet metal member and has an abutment plate 285*a*, a first fin 285*b* of a comb teeth configuration, and a second fin 258*c* of a comb teeth configuration. The abutment plate 285*a* is disposed into a flat plate shape so as to be brought into abutment with the IC chip 301. The first fin 285*b* is provided in such a manner as to extend perpendicularly downwards from the abutment plate 285*a*. The second fin 285*c* is disposed adjacent to the first fin 285*b* at right angles thereto and inclines inwardly. The IC heat sink 285 is attached to a corner portion of the optical case 61 in such a manner that the first fin 285*b* is oriented towards the front surface 250*e*. As a result, the first fin 285*b* and the second fin 285*c* are disposed along an outer circumference of the optical case 61.

Figure 8:
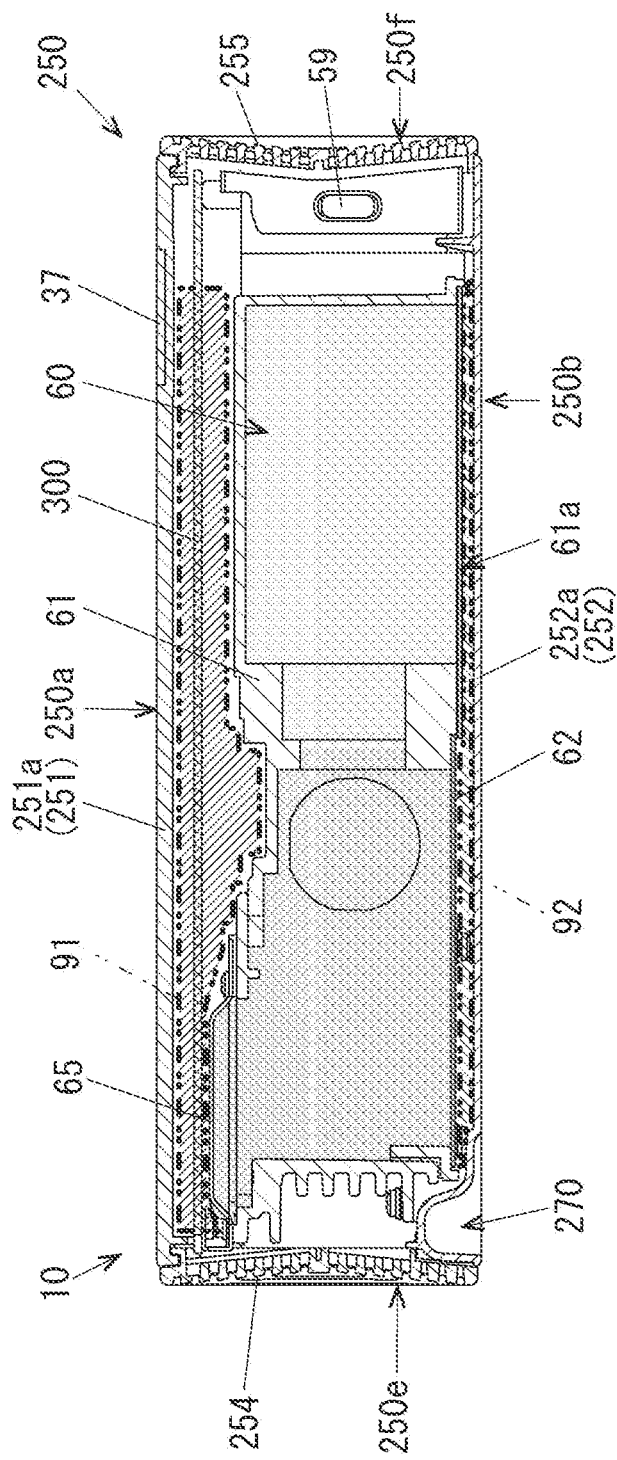
FIG. 8 is a sectional view of the projector according to the embodiment of the present invention taken along a line VIII-VIII in FIG. 1 with the interior of the optical case of the projector omitted from illustration but shaded.
Figure 9:
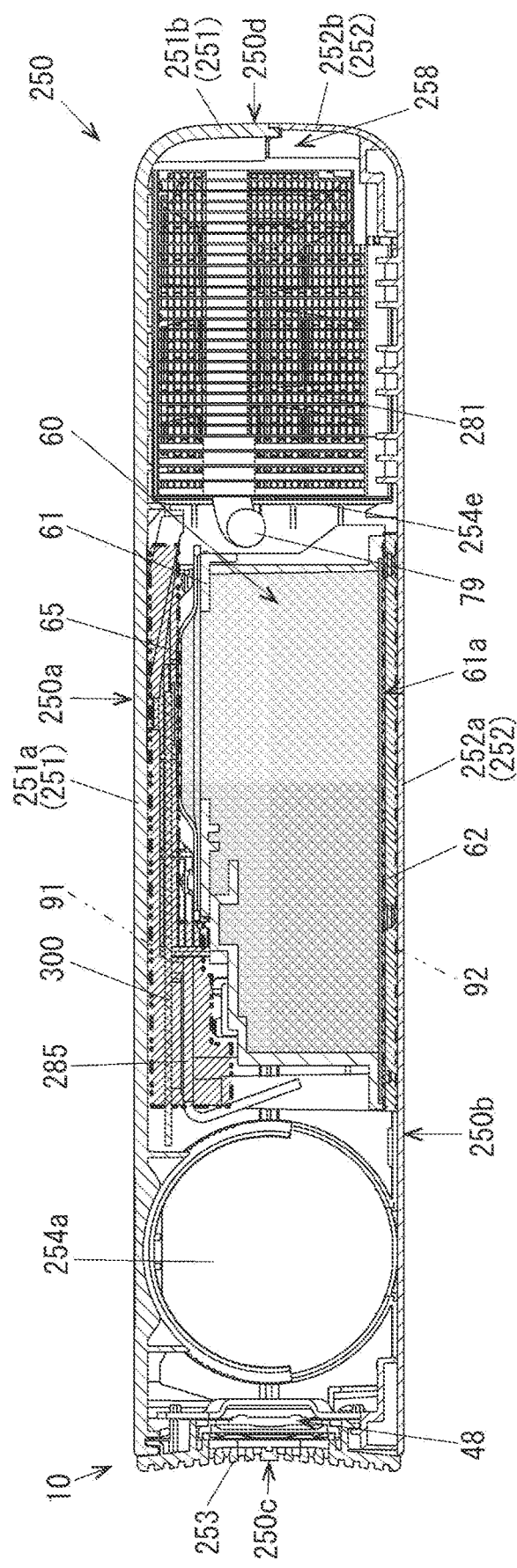
FIG. 9 is a sectional view of the projector according to the embodiment of the present invention taken along a line IX-IX in FIG. 1 with the interior of the optical case of the projector omitted from illustration but shaded.

As shown in FIGS. 8 and 9, and in FIG. 6, too, a gap is defined between the case 250 of the projector 10 and the optical case 61 (the optical apparatus 60). Then, an area including a gap defined between an upper surface of the optical case 61 (the optical apparatus 60) and a lower surface of the upper panel portion 251*a* of the upper case 251 of the case 250 (an upper area surrounded by a chain double-dashed line and shaded inside) is made into a first air flow passageway 91 through which cooling air is configured to flow. Additionally, an area including a gap defined between a lower surface of the optical case 61 (the optical apparatus 60) (a lower surface of the cover member 62) and an upper surface of the lower panel portion 252*a* of the lower case 252 of the case 250 (a lower area surrounded by a chain double-dashed line and shaded inside) is made into a second air flow passageway 92 through which cooking air is configured to flow. Here, in FIGS. 8 and 9, the members such as the collective lenses and the mirrors in the interior of the optical apparatus 60 are omitted from illustration, and an interior of the closed space is instead shown shaded.

The gap between the optical case 61 and the case 250 in the first air flow passageway 91 is larger than the gap between the optical case 61 and the case 250 in the second air flow passageway 92. In other words, as shown in vertical sectional views in FIGS. 8 and 9, a sectional area of a vertical section of the first air flow passageway 91 is larger than a sectional area of a vertical section of the second air flow passageway 92. Further, in other words, the first air flow passageway 91 is wider than the second air flow passageway 92. As a result, a flow rate of cooling air in the first air flow passageway 91 is larger than a flow rate of cooling air in the second air flow passageway 92. That is, a flow path resistance in the first air passageway 91 is smaller than a flow path resistance in the second air passageway 92. Then, cooling air in the second air flow passageway 92 flows on a side facing the cover member 62 of the optical case 61.

Figure 10:
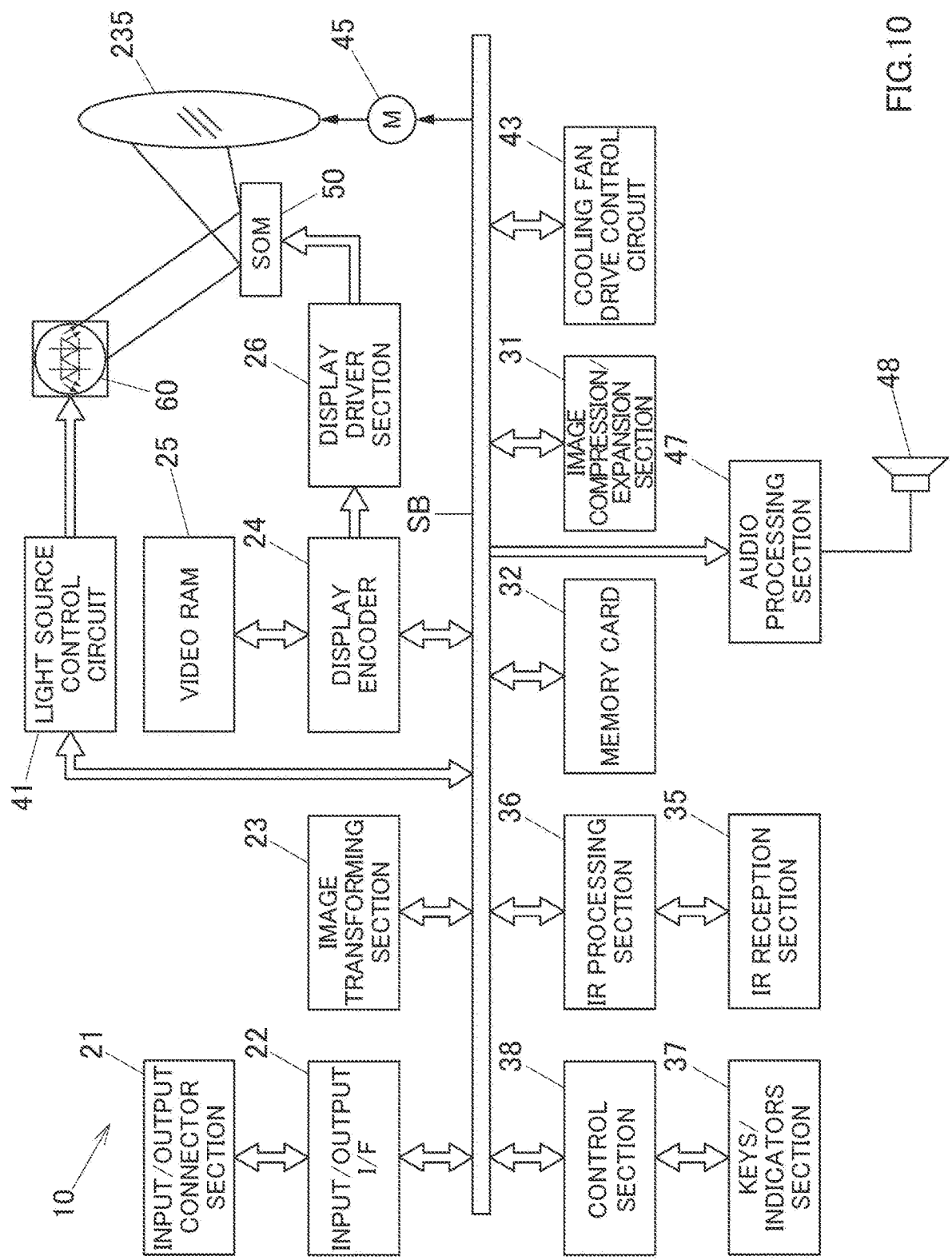
FIG. 10 is a diagram showing functional circuitry blocks of the projector according to the embodiment of the present invention.

FIG. 10 is a diagram showing functional circuitry blocks of the projector 10. A projection control unit includes a central processing unit (CPU) which includes an image transforming section 23 and a control section 38, a front-end unit which includes an input/output interface 22, and a formatter unit which includes a display encoder 24 and a display drive section 26. Image signals of various standards which are input from an input/output connector section 21 are sent to the image transforming section 23 via the input/output interface 22 and a system bus SB, and the image signals so sent are then transformed so as to be unified into an image signal of a predetermined format which is suitable for display in the image transforming section 23. Thereafter, the unified image signal of the predetermined format is output to the display encoder 24.

The display encoder 24 deploys the image signal which is input thereinto on a video random access memory (RAM) 25 for storage therein and then generates a video signal from the contents stored in the video RAM 25, outputting the video signal so generated to the display drive section 26.

The display drive section 26 drives a display device 51, which is a spatial optical modulator (SOM), at an appropriate frame rate in response to the image signal output from the display encoder 24. The projector 10 is such that light emitted from the optical apparatus 60 is shined onto the display device 51 via a light guiding optical system 140, whereby an optical image is formed by light which is reflected by the display device 51, and the optical image so formed is then projected via a projection side optical system 220 onto a projection target such as a screen, not shown, so as to be displayed on the screen. Here, the movable lens group 235 of the projection side optical system 220 can be driven using a lens motor 45 for zooming and focusing.

An image compression/expansion section 31 performs a recording process in which a luminance signal and a color difference signal of the image signal are data compressed through processing such as Adaptive Discrete Cosine Transform (ADCT), Huffman coding, or the like, and the compressed data is then sequentially written on a memory card 32, which is a detachable recording medium. Further, with the projector 10 set in a reproducing mode, the image compression/expansion section 31 reads out the image data recorded in the memory card 32 and expands the individual image data that make up a series of dynamic images frame by frame, outputting the image data so expanded to the display encoder 24 by way of the image transforming section 23. As a result, the image compression/expansion section 31 can output the dynamic images or the like based on the image data stored in the memory card 32.

The control section 38 governs the control of operations of individual circuitries inside the projector 10 and is made up of a central processing unit (CPU), a read only memory (ROM) for fixedly storing operation programs such as various settings or the like, a random access memory (RAM) used as a work memory, and the like.

The keys/indicators section 37 is made up of main keys and indicators which are provided on the case 250 of the projector 10. Operation signals of the keys/indicators section 37 are sent out directly to the control section 38. Key operation signals from a remote controller are received by an Ir reception section 35 and are demodulated into code signals in an Ir processing section 36, which are then output to the control section 38.

The control section 38 is connected with an audio processing section 47 by way of the system bus SB. This audio processing section 47 includes a circuitry for a sound source such as a PCM sound source or the like. With the projector 10 set in a projection mode and the reproducing mode, the audio processing section 47 converts audio data into analog signals and drives the speaker 48 so as to output sound or voice loudly therefrom.

The control section 38 controls a light source control circuit 41. The light source control circuit 41 controls separately operations of an excitation light shining device (a light source) 70, a red light source device (a light source) 120, the luminescent plate device 100, and the like of the optical apparatus 60 so as to enable the optical apparatus 60 to emit lights in predetermined wavelength ranges which are required in generating an image.

Further, the control section 38 causes a cooling fan drive control circuit 43 to detect temperatures using plural temperature sensors provided in the optical apparatus 60 and the like, so that the rotation speed of the cooling fan 280 is controlled based on the results of the temperature detections so carried out. Additionally, the control section 38 causes the cooling fan drive control circuit 43 to keep the cooling fan 280 rotating using a timer or the like even after a power supply to a main body of the projector 10 is switched off or causes the cooling fan control circuit 43 to switch off the power supply to the main body of the projector 10 depending on the results of the temperature detections carried out by the temperature sensors.

Next, referring to FIG. 11, an internal structure of the projector 10 will be described. In FIG. 11, the first heat sink 281 and the second heat sink 282 are shown in section so that plural fins of the first heat sink 281 and the second heat sink 282 are shown.

The optical apparatus 60 includes the red light source device 120, which is a light source of light having a wavelength in the red wavelength range or simply light in the red wavelength range, a green light source device 80, which is a light source of light having a wavelength in the green wavelength range or simply light in the green wavelength range, and the excitation light shining device 70, which constitutes not only a light source of light having a wavelength in the blue wavelength range or simply light in the blue wavelength range but also a light source of excitation light. The green light source device 80 is made up of the excitation light shining device 70 and the luminescent plate device 100. The optical apparatus 60 includes the light guiding optical system 140. The light guiding optical system 140 is configured to guide light in the green wavelength range, light in the blue wavelength range, and light in the red wavelength range altogether so as to guide the lights in the green, blue, and red wavelength ranges onto the same light path.

The excitation light shining device 70 is disposed on a right rear side of the optical case 61. The excitation light shining device 70 has plural semiconductor light emitting elements which are disposed in such a manner that optical axes of the semiconductor light emitting elements become parallel to the rear panel 255. In the present embodiment, the semiconductor light emitting elements are plural blue laser diodes 71 for emitting light in the blue wavelength range. A collimator lens 73 is attached integrally to each blue laser diode 71, and this collimator lens 73 converts light emitted from the corresponding blue laser diode 71 to parallel light while enhancing the directivity of the light. These blue laser diodes 71 are fixed to a holding plate 74. In total, eight blue laser diodes 71 are provided in two rows and four columns on the holding plate 74.

In addition, the excitation light shining device 70 includes a reflection mirror group 76, a collective lens 77, and a diffusing plate 78. The reflection mirror group 76 turns axes of lights emitted longitudinally from the right to the left from the blue laser diodes 71 from the rear to the front, that is, turns the axes of the emitted lights through about 90 degrees towards the collective lens 77. The diffusing plate 78, which is disposed at a front side of the collective lens 77, diffuses the lights emitted from the blue laser diodes 71 and collected by the collective lens 77 at a predetermined angle.

The excitation light shining device 70 is connected with a heat pipe 79 on a back side of the holding plate 74. The heat pipe 79 is connected with the first heat sink 281. The plural blue laser diodes 71, which are each a laser element, are cooled by the first heat sink 281. Distal end portions of plural fins 281a on a left side of the first heat sink 281 are caused to incline in a similar fashion to the inclined ribs 254b and the vertical ribs 254c of the inside air outlet portion 260.

The red light source device 120 is provided at a front side of the excitation light shining device 70 in the optical case 61. The red light source device 120 includes a red light source 121 and a collective lens group 125. The red light source 121 is disposed in such a manner that an optical axis thereof becomes parallel to lights emitted from the blue laser diodes 71. The collective lens group 125 collects light emitted from the red light source 121. This red light source 121 is a red light emitting diode, which is a semiconductor light emitting element for emitting light in the red wavelength range. The red light source device 120 is disposed in such a manner that an axis of light in the red wavelength range which is emitted by the red light source device 120 intersects an axis of light in the green wavelength range which is emitted from a luminescent plate 101. A back side of the red light source device 120 is connected with a heat pipe 129. The heat pipe 129 is connected with the second heat sink 282. The red light source 121, which is a light emitting diode, is cooled by the second heat sink 282.

The luminescent plate device 100, which makes up the green light source device 80, includes the luminescent plate 101, a motor 110, and a collective lens group 117 on an incident side. The luminescent plate 101 is a luminescent wheel which is disposed in such a manner as to be at right angles to an axis of light emitted from the excitation light shining device 70. This luminescent plate 101 is driven to rotate by the motor 110. The collective lens group 117 collects light, that is, excitation light emitted from the excitation light shining device 71 to the luminescent plate 101.

Although not shown, a luminescent light emitting area and a diffuse transmission area are provided end to end in a circumferential direction on the luminescent plate 101. The luminescent light emitting area is such that the relevant area receives lights in the blue wavelength range emitted from the blue laser diodes 71 as excitation lights to thereby emit luminescent light in the green wavelength range as a result of luminescent bodies on the relevant area being excited by the excitation lights. The diffuse transmission area transmits lights from the blue laser diodes 71 while diffusing them. The lights transmitted while being diffused from the relevant area are emitted as light in the blue wavelength range of the optical apparatus 60.

The light guiding optical system 140 has a first dichroic mirror 141, a first reflection mirror 143, a collective lens 146, a second dichroic mirror 148, a collective lens 149, a second reflection mirror 145, and a collective lens 147. The first dichroic mirror 141 is disposed in a position where light in the blue wavelength range emitted from the excitation light shining device 70 and light in the green wavelength range emitted from the luminescent plate 101 intersect light in the red wavelength range emitted from the red light source device 120. The first dichroic mirror 141 transmits light in the blue wavelength range and light in the red wavelength range and reflects light in the green wavelength range. An axis of the light in the green wavelength range which is reflected by the first dichroic mirror 141 is turned through 90 degrees in the direction of the left panel 253 towards the collective lens 149. As a result, an axis of the light in the red wavelength range which has passed through the first dichroic mirror 141 coincides with the axis of the light in the green wavelength range which has been reflected by the first dichroic mirror 141.

The collective lens 149 is disposed on a left side of the first dichroic mirror 141. The light in the red wavelength range which has passed through the first dichroic mirror 141 and the light in the green wavelength range which has been reflected by the first dichroic mirror 141 are both incident on the collective lens 149. The second dichroic mirror 148 is disposed on a left side of the collective lens 149 and on a rear side of the collective lens 147. The second dichroic mirror 148 reflects light in the red wavelength range and light in the green wavelength range and transmits light in the blue wavelength range. As a result, the light in the red wavelength range and the light in the green wavelength range which have been collected at the collective lens 149 are reflected by the second dichroic mirror 148 and are turned through 90 degrees to the rear. A collective lens 173 is disposed on a rear side of the second dichroic mirror 148. The light in the red wavelength range and the light in the green wavelength range which have been reflected by the second dichroic mirror 148 are incident on the collective lens 173.

The first reflection mirror 143 is disposed on an axis of the light in the blue wavelength range which has passed through the luminescent plate 101. The first reflection mirror 143 reflects light in the blue wavelength range and turns an axis of this light in the blue wavelength range through 90 degrees to the left. The collective lens 146 is disposed on a left side of the first reflection mirror 143. Additionally, the second reflection mirror 145 is disposed on a left side of the collective lens 146. The second reflection mirror 145 turns an axis of light in the blue wavelength range which has been reflected by the first reflection mirror 143 and has been collected by the collective lens 146 through 90 degrees to the rear. The collective lens 147 is disposed on a rear side of the second reflection mirror 145. Light in the blue wavelength range which has been reflected by the second reflection mirror 145 passes through the second dichroic mirror 148 by way of the collective lens 147 and is then incident on the collective lens 173. In this way, the lights in the red, green, and blue wavelength ranges which have been guided by the light guiding optical system 140 are guided on to the same light path in a light source side optical system 170.

The light source side optical system 170 includes the collective lens 173, a light axis turning mirror 179, a microlens array 175, a collective lens 183, a shining mirror 185, and a condenser lens 195. Here, since the condenser lens 195 emits image light emitted from the display device 51 disposed on a rear side of the condenser lens 195 towards the projection side optical system 220, the condenser lens 195 also constitutes a part of the projection side optical system 220.

The red, green, and blue lights which have emerged from the collective lens 173 are reflected substantially to the left by the light axis turning mirror 179 which is disposed on a rear side of the collective lens 173. The lights which have been reflected by the light axis turning mirror 179 are made into lights in which the intensities of the lights are uniformly distributed by the microlens array 175 and are then incident on the shining mirror 185 by way of the collective lens 183 to thereby be reflected. The red, green, and blue lights which have been reflected by the shining mirror 185 are shined on to the display device 51 by way of the condenser lens 195 at a predetermined angle. The display device 51 is connected with a heat pipe 59. The heat pipe 59 is connected with the third heat sink 283. The display device 51, which is a digital micromirror device (DMD), is cooled by the third heat sink 283.

The red, green, and blue lights, which are light source lights shined on to an image forming plane of the display device 51 by the light source side optical system 170, are reflected on the image forming plane of the display device 51 and are projected on to the screen by way of the projection side optical system 220 as projected lights. The projection side optical system 220 includes the condenser lens 195 and the lens barrel 225. The lens barrel 225 incorporates therein the movable lens group 235 and a fixed lens group.

By configuring the projector 10 in the way that has been described heretofore, when lights are emitted at different timings from the excitation light shining device 70 and the red light source device 120 by rotating the luminescent plate 101, lights in the red, green, and blue wavelength ranges are incident on the collective lens 173 of the light source side optical system 170 by way of the light guiding optical system 140 and further are incident on the display device 51 by way of the light source side optical system 170. As a result, the DMD, which is the display device 51 of the projector 10, displays the red, green, and blue lights in a time sharing fashion based on the data, whereby a color image can be projected from the projection port 11 on to the screen.

Figure 12:
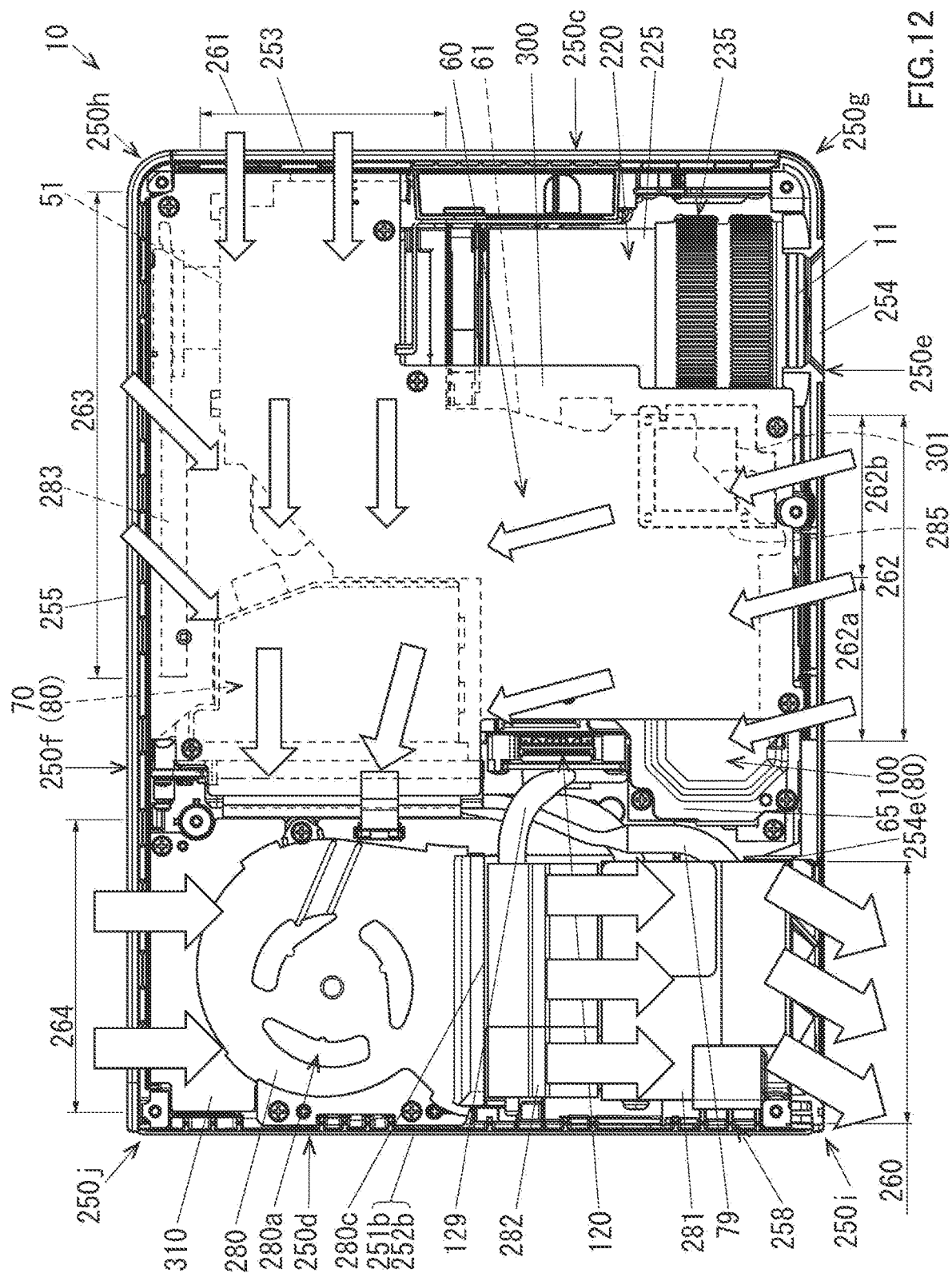
FIG. 12 is a schematic plan view showing flows of cooling air in the projector according to the embodiment of the present invention.

While the projector 10 is in use, outside air is let into the upper surface outside air inlet ports 280*a* and the lower surface outside air inlet port 280*b* of the cooling fan 280 from the front surface 250*e*, the left surface 250*c*, and the rear surface 250*f* in response to an operation of the cooling fan 280 and are then discharged to the outside from the inside air outlet portion 260 by way of the first heat sink 281 and the second heat sink 282. As shown in FIG. 12, outside air is let into the cooling fan 280 from the outside air inlet portions 261, 262, 263, 264. At this time, outside air from the outside air inlet portions 261, 262, 263 which face the first air passageway 91 and the second air passageway 92 flows more into the first air flow passageway 91 of which the flow path sectional area is larger (the flow path is wider, the flow path resistance is smaller) and flows less into the second air flow passageway 92. That is, the flow rate of outside air flowing through the second air flow passageway 92 is smaller. As a result, since outside air flows less through the second air flow passageway 92 which lies on the side facing the cover member 62 of the optical case 61, a risk is reduced of dust entering the interior of the optical case 61 via the opening portion 61*a* of the optical case 61.

As described above, since the risk of dust entering the interior of the optical case 61 is reduced by reducing the amount of outside air which flows into the second air flow passageway 92, with the projector 10, no dust-proof filter is provided for the outside air inlet portions 261 to 264. This makes it unnecessary to do maintenance work involving a replacement of filters and also eliminates a risk of generation of any down time of the projector 10 due to clogging up of filters which are provided otherwise.

Then, by making the case 250 compact in shape, in the projector 10, the interior component parts including the heat generating component parts such as the first heat sink 281 and the second heat sink 282, the excitation light shining device 70 and the red light source device 120, the display device 50, and the control circuit board 300 are disposed closely. However, with the projector 10, the cooling fan 280, as well as the first heat sink 281 and the second heat sink 281 are disposed close to the right surface 250*d*, while the outside air inlet portions 261 to 264 are provided in the other outer circumferential surfaces such as the front surface 250*e*, the left surface 250*c*, and the rear surface 250*f* than the right surface, whereby the interior component parts can be cooled well by letting in outside air into the interior of the optical case 61 from these three outer circumferential surfaces.

Hereinafter, flows of outside air mainly in the first air flow passageway 91 will be described below. Outside air let in from the left outside air inlet portion 262*b* of the outside air inlet portion 262 in the front surface 250*e* of the projector 10 cools mainly the IC chip 301 (the IC heat sink 285), and outside air let in from the right outside air inlet portion 262*a* cools mainly the luminescent plate device 100. Here, in the outside air let in from the left outside air inlet portion 262*b* of the outside air inlet portion 262, outside air flowing along a side surface of the optical case 61 also cools the IC heat sink 285. The cooling air let in from the outside air inlet portion 262 first cools the IC chip 301 (the IC heat sink 285) and the luminescent plate device 100 and then cools the red light source device 120.

On the other hand, outside air let in from the outside air inlet portion 261 in the left surface 250c of the projector 10 cools mainly the projection side optical system 220. Outside air let in from the outside air inlet portion 363 in the rear surface 250f of the projector 10 cools directly the third heat sink 283 and the display device 51. Then, the cooling air from the outside air inlet portion 261 and the cooling air from the outside air inlet portion 263 merge together. The resulting cooling air from the merger of the two flows of outside air merges further with the cooling air from the outside air inlet portion 262 that has cooled the IC chip 301 (the IC heat sink 285), the luminescent plate device 100, and the red light source device 120 to cool the excitation light shining device 70.

The cooling air which flows through the first air flow passageway 91 in response to the operation of the cooling fan 280 cools the control circuit board 300 while performing the cooling operations described above. Since the control circuit board 300 is disposed in a substantially central position in the up-down direction in the first air flow passageway 91, the cooling air flows substantially uniformly on an upper side and a lower side of the control circuit board 300. In addition, in the second air flow passageway 92, outside air let in from the outside air inlet portions 261, 262, 263 flows to cool the whole of the lower surface of the optical case 61.

The cooling air from the first air flow passageway 91 which has cooled the excitation light shining device 70 is let mainly into the upper surface outside air inlet ports 280a in the cooling fan 280, and the cooling air from the second air flow passageway 92 is let into the lower surface outside air inlet port 280b. On the other hand, outside air from the outside air inlet portion 264 in the rear surface 250f which is positioned at the rear of the cooling fan 280 is let in mainly from the lower surface outside air inlet port 280b of the cooling fan 280. At this time, the power supply circuit board 310 disposed directly below the cooling fan 280 is cooled by the outside air from the outside air inlet portion 264. The cooling air from the first air flow passageway 91 and the cooling air from the second air flow passageway 92 are also partially used to cool the power supply circuit board 310.

The cooling air let into the cooling fan 280 is discharged from the discharge port 280c of the cooling fan 280. The cooling air discharged from the discharge portion 280c cools the second heat sink 282 which is disposed on a side facing the discharge port 280c, then cools the first heat sink 281 which is disposed on a side facing the front surface 250e and is eventually discharged from the inside air outlet portion 260 to the outside. A direction in which the heated cooling air is discharging from the inside air outlet portion 260 inclines in a direction in which the heated cooling air so discharged moves away from a direction in which outside air is let into the outside air inlet portion 262, which lies near to the inside air outlet portion 260, by the inclined ribs 254b and the vertical ribs 254c of the inside air outlet portion 260 and the distal end portions of the fins 281a of the first heat sink 281.

In the projector 10, the cooling air so used is let out from the single inside air outlet portion 260 disposed in the front surface 250e. Consequently, even with the projector 10 including the blower type cooling fan 280 for which a resistance to discharged air needs to be taken into consideration, other equipment can be disposed close to the upper, lower, left, right, and rear sides of the projector 10. As a result, the projector 10 can easily be used as built-in equipment.

Outside air (cooling air) let in from the outside air inlet portions 261, 262, 263, 264 in response to the operation of the cooling fan 280 starts cooling from the members of relatively low heat release values (the IC chip 301, the luminescent plate device 100, the red light source device 120 and the display device 51, and the third heat sink 283) gradually to the members of relatively high heat release values (the excitation light device 70, the power supply circuit board 310, the second heat sink 282, and the first heat sink 281). Then, in view of the heat release values of the members, the excitation light shining device 70 is disposed downstream of the red light source device 120, and the first heat sink 281 is disposed downstream of the second heat sink 282.

Here, the front panel 254 includes a partition plate 254e which separates the first heat sink 281 from the first air flow passageway 91 and the second air flow passageway 92. The partition plate 254e is disposed at a left end of the inside air outlet portion 260 (that is, at a left side of the first heat sink 281). In addition, plural vertical rib-shaped stop plates 258 are provided between the right upper panel portion 251b of the upper case 251 and the right lower panel portion 252b of the lower case 252 in such a manner as to be erected from inner surfaces of the right upper panel portion 251b and the right lower panel portion 252b. Air being let out from the inside air outlet portion 260 is swirled to be turned to the right of the first heat sink 281 by the stop plates 258, thereby preventing the air from being let into the cooling fan 280 again.

Figure 13:
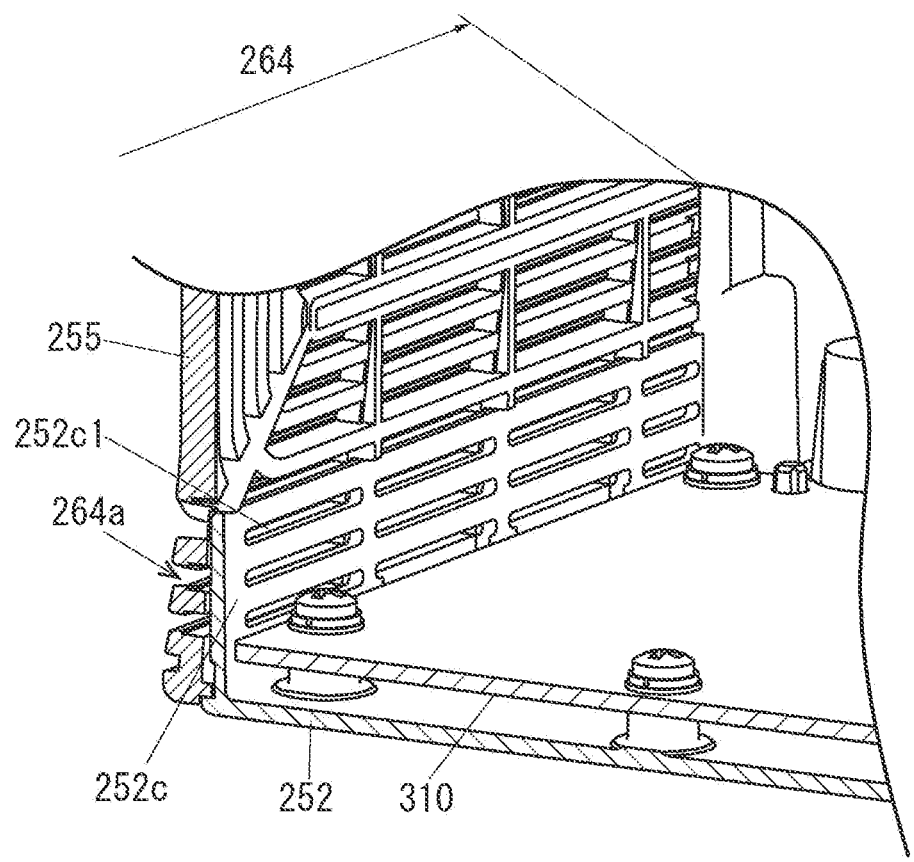
FIG. 13 is a sectional view of a case and a power supply circuit board of the projector according to the embodiment of the present invention taken along a line XIII-XIII in FIG. 11.

As shown in FIG. 13, a shield wall 252c is provided near to the outside air inlet portion 264 in the lower case 252. The shield wall 252c is provided integrally with the lower case 252 which is formed from a metallic material through die casting. The shield wall 252c is provided parallel to the rear panel 255. The shield wall 252c has plural flow holes 252c1. The plural flow holes 252c1 are the same in position and shape as outside air inlet holes 264a making up the outside air inlet portion 264 which is provided in the rear panel 255. Specifically speaking, the flow holes 252c1 and the outside air inlet holes 262a are both formed into identical thin horizontally elongated holes and are both disposed in such a manner as to be superposed on each other in the front view (when the flat plate-shaped rear panel 255 is viewed from the flat plate side (in a front-rear direction of the projector 10)).

With the shield wall 252c, even though the power supply circuit board 310 is disposed near to the plural outside air inlet holes 264a, the influence of static electricity and/or electromagnetic wave on the power supply circuit board 310 from the outside of the projector 10 via the outside air inlet holes 264a of the outside air inlet portion 264 can be reduced. Then, since the flow holes 252c1 and the outside air inlet holes 264a are disposed in such a manner as to match with each other, the shield wall 252c never interrupts the entrance of outside air from the outside air inlet portion 264.

Thus, while the embodiment of the present invention has been described heretofore, the present invention is not limited by the embodiment but can be carried out in various forms by making modifications thereto as required. For example, in the present invention, the first air flow passageway 91 is provided at the upper portion of the projector 10, while the second air flow passageway 92 is provided at the lower portion of the projector 10. However, the present invention is not limited to this configuration. For example, in the case that the opening portion 61a of the optical case 61 is provided in the upper surface side of the optical case 61 and the cover member 62 is provided on the upper surface side of the optical case 61, a configuration may be adopted in which the second air flow passageway 92 is provided at the upper portion of the projector 10, while the first air flow passage 91 is provided at the lower portion of the projector 10. In addition, the shield wall 252c may be provided separately from the lower case 252. Additionally, a configuration may also be adopted in which the cooling fan 280 is disposed at the front side of the first heat sink 281, cooling air that has been used to cool sequentially the second heat sink 282 and the first heat sink 281 is caused to be let into the cooling fan 280 from the first air flow passageway 91 and the second air flow passageway 92, and the heated cooling air is discharged to the outside directly from the cooling fan 280 by way of the inside air outlet portion 260.

Thus, according to the embodiment of the present invention that has been described heretofore, the projector 10 includes the optical apparatus 60, the control circuit board 300 which is disposed above the upper side of the optical apparatus 60, the cooling fan 280 disposed near to the outside air inlet portion 264 which constitutes the rear surface outside air inlet portion of the case 250 which lies opposite to the projection direction and having the upper surface outside air inlet ports 280a configured to let in outside air from the upper surface and the lower surface outside air inlet port 280b configured to let in outside air from the lower surface, and the heat sink (the first heat sink 281, the second heat sink 282) provided corresponding to the discharge port 280c of the cooling fan 280 and connected to the optical apparatus 60, and the flow path resistance on the side facing the lower surface outside air inlet port 280b is smaller than the flow path resistance on the side facing the upper surface outside air inlet ports 280a.

As a result, outside air let in from the outside air inlet portion 264 is let in mainly from the lower surface outside air inlet port 280b of the cooling fan 280, and the cooling air which has cooled the control circuit board 300 is let in from the upper surface outside air inlet ports 280a, whereby the projector 10 can be cooled properly with the single cooling fan 280.

In addition, the lower surface outside air inlet port 280b of the cooling fan 280 is larger than the upper surface outside air inlet port 280a thereof. As a result, more outside air can be let in from the outside air inlet portion 264 via the lower surface side of the cooling fan 280 where the flow path resistance is small.

The cooling fan 280 is disposed at the upper portion in the case 250 in the thickness direction thereof, and the lower space Y defined on the lower side of the cooling fan 280 in the case 250 is wider than the upper space X defined on the upper side of the cooling fan 280 in the case 250. As a result, outside air can be let in more efficiently from the lower side of the cooling fan 280 by way of the outside air inlet portion 264.

The cooling fan 280 is provided near the right surface 250d, which constitutes the first side surface of the case 250. Outside air is let into the case 250 from the three surfaces of the case 250 which are the front surface 250e in which the projection port 11 is provided, the left surface 250c, which is the second side surface which faces the first side surface (the right surface 250d), and the rear surface 250f which faces the front surface 250e in response to the operation of the cooling fan 280. As a result, the whole of the control circuit board 300 can be cooled well.

Even in the event that an outside air inlet portion is provided in the right surface 250d where the cooling fan 280 and the light source heat sinks (the first heat sink 281, the second heat sink 282) are disposed, since the amount of outside air which is let in from the other three surfaces is reduced, the overall cooling efficiency is deteriorated. As a result, it is desirable that no outside air inlet portion is provided in the right surface 250d of the case 250.

Additionally, in the event that an outside air inlet portion is provided in the upper surface 250a of the case 250, although there is a possibility that the excitation light shining device 70 which includes the laser light sources lying close to the cooling fan 280 can be cooled well, similarly, the amount of outside air which is let in from the other three surfaces is reduced, whereby the overall cooling balance is lost, and the overall cooling efficiency is deteriorated. As a result, it is desirable that no outside air inlet portion is provided in the upper surface 250a of the case 250.

Further, in the event that an outside air inlet portion is provided in the lower surface 250b of the case 250, there may be a case in which a cooling effect can be expected. However, the lower surface 250b of the case 250 lies close to a setting surface where the case 250 is set, and hence, the state of the lower surface 250b tends to be easily affected from the upper surface 250a by a place and a condition of use by the user. For example, in the case that the case 250 is set on a cushion, there may be caused a risk that outside air is not let into the interior of the case 250 properly. In addition, there should be left as less space as possible in the interior of the case 250 in order to make the overall shape of the product compact. Then, in the present embodiment, the design is adopted in which almost no space is provided on the side facing the lower surface 250b, and to this end, the cover member 62 of the optical apparatus 60 is provided on the side facing the lower surface 250b. A design like this is also advantageous from a dust-proof point of view. Due to this, it is desirable that no outside air inlet portion is provided in the lower surface 250b of the case 250.

The cooling fan 280 is provided only one in the case 250, and no plural cooling fans are provided therein. As a result, the projector 10 which is compact in size can be realized.

The projector 10 includes the first heat sink 281 for the laser elements (the blue laser diodes 71) and the second heat sink 282 for the light emitting diode (the red light source 121) which is provided closer to the cooling fan 280 than the first heat sink 281. As a result, since cooling air is blown sequentially to the heat generating members aligned in the order of increasing their heat release value, the cooling efficiency can be enhanced further.

The control circuit board 300 is disposed within the first air flow passageway 91 provided on the upper side of the optical apparatus 60, whereby outside air which is being let into the cooling fan 280 by way of the first air flow passageway 91 in response to the operation of the cooling fan 280 cools the control circuit board 300. As a result, the control circuit board 300 incorporating therein electronic components of high heat release values can be cooled well.

In addition, the IC heat sink 285 made up of the sheet metal member for cooling the IC chip 301 is disposed in the first air flow passageway 91. As a result, the IC chip 301 having a particularly high heat release value can be cooled well.

The first air flow passageway 91 is wider than the second air flow passageway 92 which is provided on the lower side of the optical apparatus 60, and the flow path resistance in the first air flow passageway 91 is smaller than the flow path resistance of the second air flow passageway 92. As a result, the sufficient space is secured in the first air flow passageway 91, whereby the equipment having high heat release values can be disposed therein.

The opening portion 61a of the optical apparatus 60 is provided in the lower side in the thickness direction of the case 250, and the opening portion 61a is closed by the cover member 62. As a result, the flow rate of outside air, that is, the risk of entrance of dust can be reduced by narrowing the gap defined between the lower side of the optical apparatus 60 and a bottom plate of the case 250, whereby the risk of dust entering the interior of the optical apparatus 60 can be reduced. Thus, there is no necessity of providing dust-proof filters for the outside air inlet portions 261 to 264.

The case 250 includes the outside air inlet and inside air outlet portion including the outside air inlet portion 262 and the inside air outlet portion 260 in the front surface 250e in which the projection port 11 is provided. The inside air let-out direction of the inside air outlet portion 260 inclines in such a manner as to move away from the outside air let-in direction of the outside air inlet portion 262. As a result, since a risk of the heated inside air that is let out from the inside air outlet portion 260 disposed in the front surface 250e being let into the case 250 again from the outside air inlet portion 262 can be reduced without providing any air flow passageway such as a separate duct, the outside air inlet portion 262 can also be provided in the front surface 250e.

The case 250 has the metallic shield wall 252c having the plural air flow holes 252c1 which are superposed, in the front view, on the plural outside air inlet holes 264a of the outside air inlet portion 264 in the plural outside air inlet and inside air outlet holes of the outside air inlet and inside air outlet portion. As a result, the electrical unfavorable influences on the power supply circuit board 301 which is disposed close to the outside air inlet portion 264 can be reduced. A shield wall like this shield wall 252c can be provided not only for the outside air inlet portion 264 but also for the other outside air inlet portions including the inside air outlet portion, that is, for the outside air inlet and inside air outlet portion having the plural outside air inlet holes and the plural inside air outlet holes.

The embodiment that has been described heretofore is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. A projector, comprising:
   an optical apparatus;
   a control circuit board disposed above an upper side of the optical apparatus;
   a cooling fan disposed near a rear surface outside air inlet portion of a case which lies opposite to a projection direction and having an upper surface outside air inlet port configured to let in outside air from an upper surface and a lower surface outside air inlet port configured to let in outside air from a lower surface of the case; and
   a heat sink provided corresponding to a discharge port of the cooling fan and connected with the optical apparatus,
   wherein a flow path resistance on a side facing the lower surface outside air inlet port is smaller than a flow path resistance on a side facing the upper surface outside air inlet port.

2. The projector according to claim 1,
   wherein the lower surface outside air inlet port is larger than the upper surface outside air inlet port.

3. The projector according to claim 1,
   wherein the cooling fan is disposed at an upper portion in a thickness direction of the case, and
   wherein a lower space defined on a lower side of the cooling fan in the case is wider than an upper space defined on an upper side of the cooling fan in the case.

4. The projector according to claim 1,
   wherein the cooling fan is provided near a first side surface of the case,
   wherein outside air is let into the case from three surfaces of the case which are a front surface in which a projection port is provided on the case, a second side face facing the first side surface, and a rear surface facing the front surface in response to an operation of the cooling fan, and
   wherein no outside air is let in from the first side surface.

5. The projector according to claim 1,
   wherein the cooling fan is provided only one and no plural cooling fans are provided in the case.

6. The projector according to claim 1,
   wherein the heat sink comprises a first heat sink for a laser element and a second heat sink for a light emitting diode, the second heat sink being disposed closer to the cooling fan than the first heat sink.

7. The projector according to claim 1,
   wherein the control circuit board is disposed within a first air flow passageway provided on the upper side of the optical apparatus, and
   wherein outside air which is being let into the cooling fan by way of the first air flow passageway in response to an operation of the cooling fan cools the control circuit board.

8. The projector according to claim 7,
   wherein an IC heat sink made up of a sheet metal member for cooling an IC chip is disposed in the first air flow passageway.

9. The projector according to claim 7,
   wherein the first air flow passageway is wider than a second air flow passageway provided on a lower side of the optical apparatus, and a flow path resistance of the first air flow passageway is smaller than a flow path resistance of the second air flow passageway.

10. The projector according to claim 1,
    wherein an opening portion of the optical apparatus is provided in a lower side of the case in the thickness direction of the case, and
    wherein the opening portion is closed by a cover member.

11. The projector according to claim 1,
    wherein the case comprises an outside air inlet and inside air outlet portion comprising an outside air inlet portion and an inside air outlet portion in a front surface thereof in which a projection port is provided, and
    wherein an inside air let-out direction of the inside air outlet portion inclines in such a manner as to moves away from an outside air let-in direction of the outside air inlet portion.

12. The projector according to claim 11,
    wherein the case comprises a metallic shield wall comprising plural air flow holes which are superposed, in a front view, on plural outside air inlet and inside air outlet holes of the outside air inlet and inside air outlet portion.

* * * * *